United States Patent

[11] 3,543,787

[72] Inventor Jerry J. Tepper
    7201 Sheridan Blvd., Arvada, Colorado 80002
[21] Appl. No. 797,558
[22] Filed Feb. 7, 1969
[45] Patented Dec. 1, 1970

[54] PRESSURE WASHER CONSOLE
    8 Claims, 3 Drawing Figs.
[52] U.S. Cl. .................................................. 137/266,
    137/571; 222/132
[51] Int. Cl. .................................................. E03b 11/00
[50] Field of Search .................................................. 137/266,
    265, 263, 259, 572, 571, 575; 239/414, 304; 222/132

[56] References Cited
UNITED STATES PATENTS

| | | | |
|---|---|---|---|
| 1,404,467 | 1/1922 | Mohr | 137/266 |
| 1,715,922 | 6/1929 | Hix | 137/265X |
| 2,508,170 | 5/1950 | Kaufmann | 137/571X |
| 3,251,508 | 5/1966 | Borys | 222/132 |
| 3,433,417 | 3/1969 | Poppitz | 239/304 |

Primary Examiner—M. Cary Nelson
Assistant Examiner—R. B. Rothman
Attorney—C. B. Messenger ABSTRACT: High-pressure apparatus for cleaning muddy, greasy, and soiled surfaces which includes a multistage pump selectively interconnectable to storage compartment sources for solvents, heated water, and/or cleaners and rinsing solutions with apparatus for regulating the supply level and the discharge rate of the variously useable solutions and/or combinations thereof.

Patented Dec. 1, 1970
3,543,787
Sheet 1 of 2
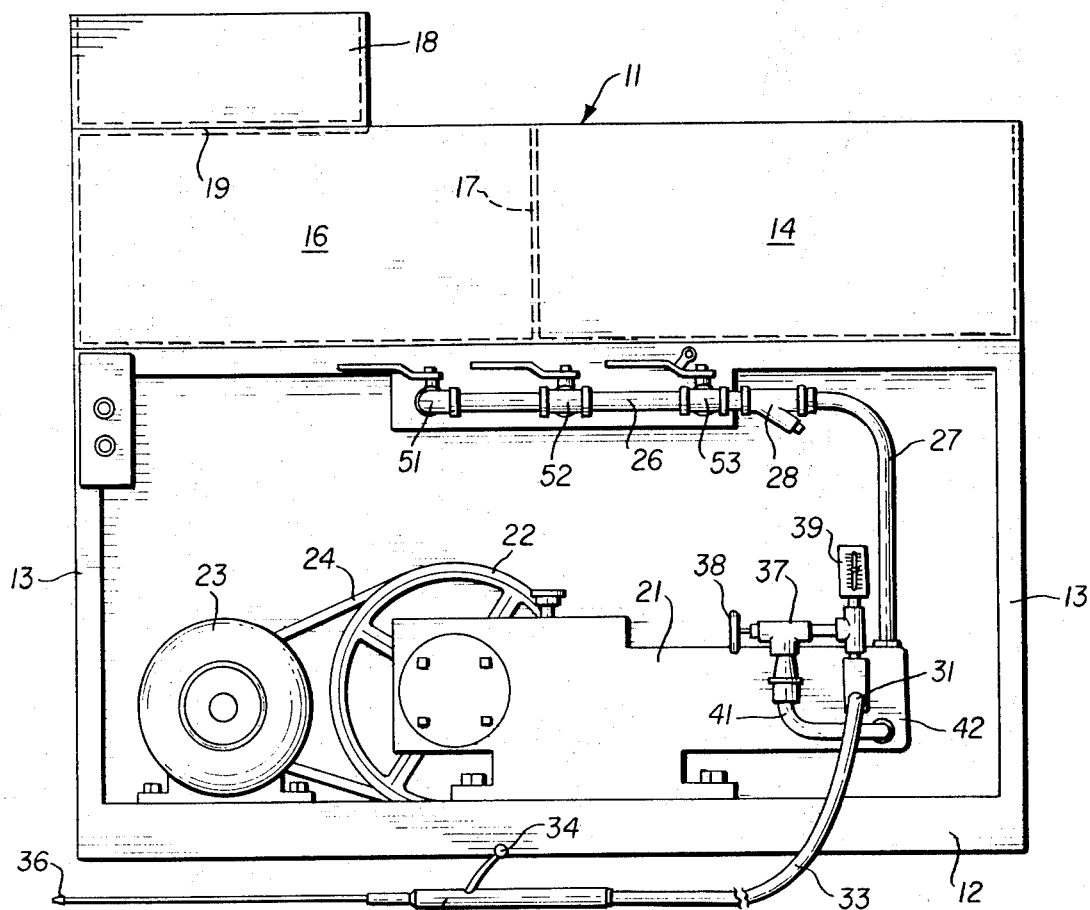
Fig_1
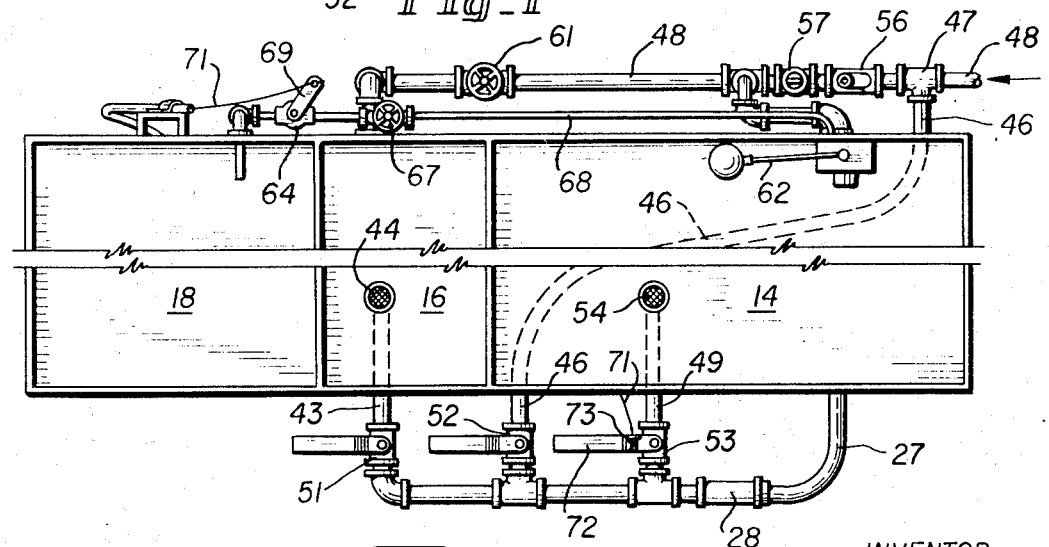
Fig_2
INVENTOR
JERRY J. TEPPER
BY
ATTORNEY

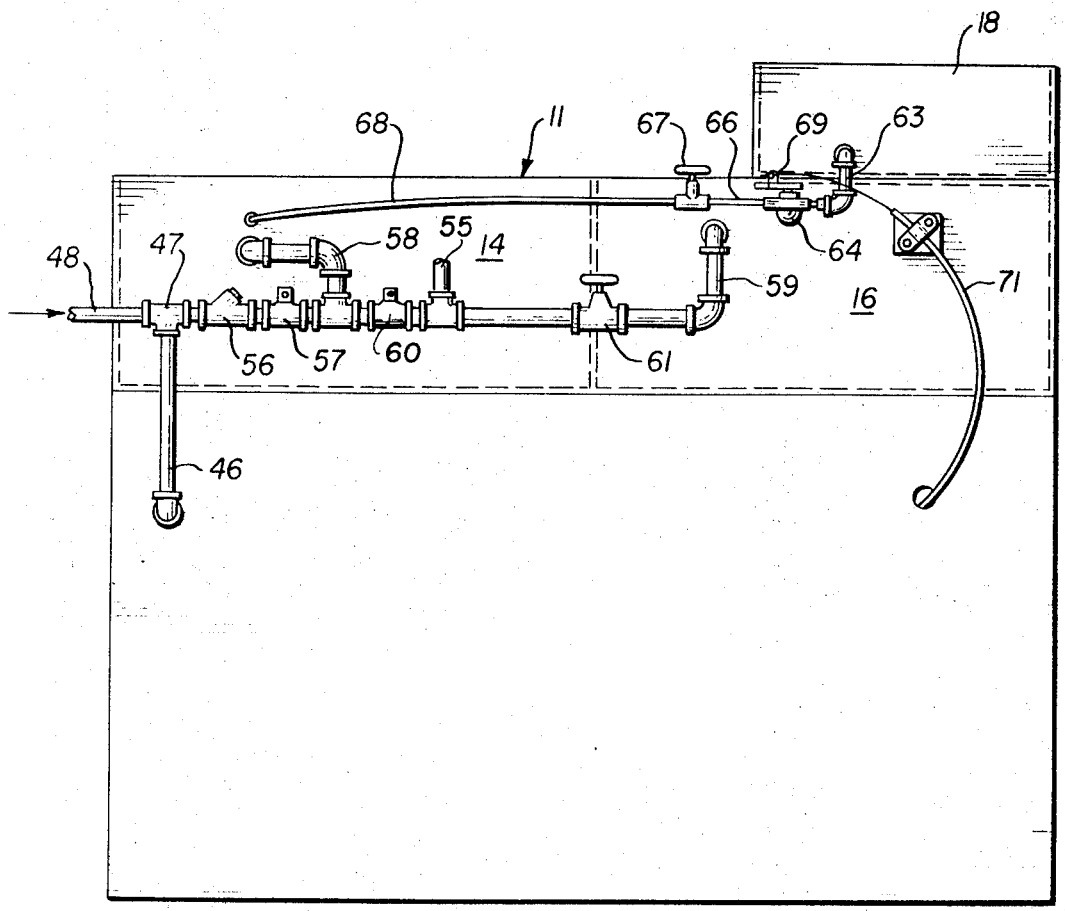
Fig_3

3,543,787

PRESSURE WASHER CONSOLE

BACKGROUND OF THE INVENTION

The present development is made in the field of pressurized washers of the type used for cleaning large equipment, over-the-road carriers, food and industrial processing equipment, plant interiors and the like. In such field the equipment supplants the previous widespread usage of steam to accomplish the desired cleaning in a more economical and less troublesome manner. The combination equipment utilizes water expelled under high pressure as the main cleaning and rinsing ingredient. With use of proper combinations of solutions all types of equipment can be efficiently cleaned by the present apparatus. Any of the cleaning solvents or rinsing solutions used are expelled through an operator nozzle at a pressure in excess of 1,000 pounds. The cleaning power of such solutions is, accordingly, supplemented by the excess pressure of application.

Some previous cleaning apparatus has been built utilizing a high-pressure washing principle. In general, the apparatus of the present invention is intended to provide a larger and more efficient apparatus to work in the higher pressure ranges to accomplish more efficient article cleaning. The combination of supply reservoirs and inlet and discharge controls therefor makes economical and efficient cleaning of many different types of equipment having different qualities of soiled surfaces possible.

SUMMARY OF THE INVENTION

Briefly stated, the present invention provides high-pressure washer apparatus in which a multistage pump together with a drive motor therefor is mounted integrally with storage compartments or reservoirs adapted to receive various liquids that can be used beneficially to obtain efficient cleaning of soiled equipment. Control valves for regulating the discharge of separate solutions are provided. Through manipulation of such valves, prewash, wash, and rinse cycles can be accomplished by regulation of the solutions introduced into the pump and pressurized thereby before discharge through an operator discharge nozzle. Regulating means is provided to interconnect a plurality of the storage compartments and the individual control valves therefor to obtain beneficial and efficient intermixing of chosen solutions to provide an improved cleaning result.

It is an object of the invention to provide an integral and compact apparatus combination that is adaptable for the efficient washing of various types of soiled equipment.

It is another object of the invention to provide apparatus that may be manufactured economically and that may be used by untrained personnel to efficiently and economically clean soiled equipment.

A further object is to provide apparatus for the efficient intermixing of cleaner solutions and water to obtain optimum cleaning results economically.

Further objects and advantages of the present invention will be apparent from the appended description and drawings.

BRIEF DESCRIPTION OF THE DRAWINGS

FIG. 1 is a front elevation with parts shown in dotted outline;

FIG. 2 is a top view in broken section illustrating the apparatus and the respective reservoirs with the reservoir covers removed; and FIG. 3 is a rear elevation with parts shown in dotted outline.

DESCRIPTION OF THE PREFERRED EMBODIMENTS

In the accompanying FIGS. a pressure washer console 11 is illustrated. The console includes a bed frame 12 and a plurality of upright standards 13 providing support for elevated tank compartments or reservoirs. A reservoir 14 for the reception and storage of heated water is separated from a tank 16 for the reception and storage of solvent solutions by a bulkhead 17 disposed therebetween. A cleaner solution receptacle 18 is disposed above the solvent tank 16 and is maintained separate therefrom by the bottom 19.

The base frame 12 provides support for a multistage, high-pressure pump 21 having an input drive wheel 22 that is connected to a drive motor 23 by a belt drive 24. A fluid manifold 26 is interconnected to the inlet of the pump by an inlet hose 27. A screen trap 28 is provided in such circuit so that all liquids delivered from the manifold 26 will be screened before introduction into the pump. The liquids and solutions introduced into the pump are pressurized by the multistages thereof and are delivered through an outlet 31 to an operator wand 32 by a long high-pressure hose 33. The wand 32 has a cross handle 34 to facilitate manipulation thereof so that the discharge nozzle 36 may be directed at surfaces that are to be washed.

A pressure relief valve 37 is provided in a circuit interconnected in the outlet 31. The stem 38 of the pressure relief valve may be regulated to change the output pressure as indicated on the pressure scale 39. A bypass circuit 41 interconnects the discharge of the pressure relief valve back to the head 42 of the pump so that excess pressurized liquid can be returned to the pump for subsequent pressured discharge.

A plurality of control valves are disposed on the manifold 26 so that separate solutions may be introduced into the inlet of the pump. A first control valve 51 regulates the introduction of solvents or similar materials from the tank 16. A second valve 52 regulates the introduction and use of rinse water, and the third valve 53 regulates the introduction and use of heated water from the reservoir 14. The valve 51 is connected by pipe 43 to an outlet 44 in the tank 16. The valve 52 is connected by a pipe or hose 46 to a tee-fitting 47 on an input line 48 disposed at the rear of console 11. The valve 53 is connected to a drain outlet 54 in the reservoir 14 by a conduit 49.

At the rear of the washer apparatus console 11 inlet line 48 IS used to introduce water or other liquid into the separate supplies. The inlet line 48 includes a check valve 56 and a control valve 57. Branch piping 58 delivers the input liquid into the reservoir 14 while separate branch piping 59 can be used to deliver the same liquid into the tank 16. A stopcock 61 is used to open, close, or regulate flow to the branch piping 59 as desired. Branch piping 58 is connected inside of the reservoir 14 to a ball float valve 62 as shown in FIG. 2. This ball float valve 62 regulates the level of liquid introduced into the reservoir 14.

Cleaning powders or solutions are introduced into receptacle 18. The discharge of these cleaners from the receptacle 18 passes through an outlet 63 to an on-off valve 64. From the on-off valve the discharge is carried by tube 66 to a regulable metering valve 67 before it is delivered by tube 68 to a point of discharge in reservoir 14 for direct intermixture in the heated water supply retained therein.

A push-pull control cable 71 interconnects a handle 69 on the on-off valve 64 and the operator handle 72 for the valve 53. A pivoted cable receptacle 73 on the handle 72 energizes reciprocal movement of the cable 71 as the handle 72 is rotated. Accordingly, when heated water from the reservoir 14 is being introduced to the pump, a regulated quantity of cleaning solution from the receptacle 18 will be introduced by the tube 68 into the heated water reservoir. This coordinated discharge of heated water and cleaner will maintain a regulated intermixture of cleaner and heated water in the reservoir 14 as necessary to obtain the most efficient cleaning of items being washed by the pressure washer 11.

In a typical use of the apparatus where surfaces to be cleaned are heavily soiled with grease and grime, the solvent control valve 51 is first opened so that a cleaning solvent is discharged into the pump for pressurized application by the nozzle 36. Various types of petroleum solvents are usually used for this presoaking or prewash operation. Kerosene, diesel fuel and similar liquids can be used. These solvents can likewise incorporate various additional solutions and detergents in order to speed the wetting and soil loosening capabilities of the solvent.

After a dirty surface has been coated with solvent from the tank 16, the control valve 51 is closed, and subsequently the control valve 53 is manipulated to introduce a water and cleaner combination from the reservoir 14. Usually heated water is preferred in this washing cycle. Accordingly, the inlet 55 may be connected directly to a hot water tank or other hot water supply so that all liquid introduced into the reservoir 14 will be heated. Since movement of the valve 53 is coordinated to provide opening for the on-off valve 64, a regulated quantity of cleaner solution will be automatically introduced into the reservoir 14. Since various washing operations may require a different concentration of cleaner solution in the hot water, the metering valve 67 may be regulated to control the flow rate of such solution. The combination of an on-off valve 64 and metering valve 67 is desirable, since better regulation of the cleaning solution introduction is obtained by such combination. With the valve system illustrated the concentration and strength of the water and cleaning solution mixture may be closely regulated. When the metering valve 67 is accurately set with respect to the discharge flow from the operator nozzle 36, the concentration and strength of the solution retained in or discharged from reservoir 14 will be quite constant. For most washing operations a predetermined positioning of metering valve 67 will provide an efficient solution strength. Where the apparatus is to be used in cleaning of a single type of equipment, the setting for the metering valve 67 can be established, and thereafter no additional operator attention to this detail will be required. Whenever the valve 53 is opened a proper quantity of cleaner solution will be intermixed with the liquid in reservoir 14.

After a washing cycle has been completed the valve 53 will be closed, and valve 52 may be opened to introduce cold water from inlet 48 and pipes 46 directly into the pump 21 to provide a final cleaning. Various mixtures of hot and cold water may be used for all other prewash and washing operations. As shown in FIG. 3, hot water is introduced at the inlet 55, while the cold water is introduced at the inlet 48. Adjustments of the valves 57 and 60 can be made to change the mixed water temperature being introduced through the branch piping 58 to reservoir 14. Heated water together with varying quantities of cold water may likewise be introduced by the branch piping 59 into the tank 16 when stopcock 61 and valve 57 are open. When heated water is being used, the check valve 56 operates to prevent reverse flow of heated water into the cold water inlet system. This check valve not only prevents the loss of hot water in the rinsing cycle, but it further prevents contamination of the inlet water system. Where the unit is connected to a city water supply, the check valve, accordingly, serves a dual purpose.

The entire apparatus is compact and sturdy. Where the tanks and reservoir are made of stainless steel, the apparatus and console 11 can itself be kept in clean condition. The console may be mounted on roller support elements, and, accordingly, it can be easily moved to different positions of use. Apparatus made in accordance with the illustrated embodiment of the invention operates at a pressure of 1,400 p.s.i. and delivers pressurized liquid at the rate of approximately 4 gallons per minute. The apparatus has been beneficially introduced into the food processing plants and into separate industries for cleaning trucks and road equipment and aircraft. Its use in shops and service centers has substantially improved equipment maintenance conditions.

I claim:

1. Pressure washer apparatus comprising a frame support, a plurality of solution reservoirs on said support to receive and hold different liquid solutions, a pump on said support for pressurizing solutions from said reservoirs, flow conduits interconnecting said pump and reservoirs, control elements for selectively introducing solutions from said reservoirs to said pump, means interconnecting at least two of said reservoirs whereby solution combinations may be obtained by the intermixture of said solutions, separate valve means for controlling the intermixture of said solutions, and means interconnecting at least one of said control elements and said separate valve means for conjoint operation whereby a regulated intermixture of said solutions is obtained for introduction to said pump.

2. Structure as set forth in claim 1 wherein said reservoirs are elevated above the pump for gravity flow of solutions to said pump.

3. Structure as set forth in claim 1 wherein said control elements and separate valve means are at remote positions, and further comprising mechanical linkage means for the interconnection thereof.

4. Structure as set forth in claim 3 wherein said linkage means is a cable.

5. Structure as set forth in claim 1 wherein said separate valve means is inclusive of an off or full-flow on-valve.

6. Structure as set forth in claim 5 wherein one solution reservoir is elevated with respect to another reservoir for gravity flow of one solution therebetween with said flow being regulated by said off-on valve.

7. Structure as set forth in claim 6 and further comprising a metering valve for use conjointly with said separate valve means for the regulation of solution flow.

8. Structure as set forth in claim 7 wherein said control elements and separate valve means are at remote positions one from the other, and further comprising a push-pull cable linkage means therebetween for the conjoint operation thereof.